United States Patent
Marfatia et al.

(10) Patent No.: US 9,499,154 B2
(45) Date of Patent: Nov. 22, 2016

(54) METHOD TO INITIATE, MANAGE, AND ADAPT VEHICLE MOTION AT LOW SPEEDS IN A WET CLUTCH DUAL CLUTCH TRANSMISSION

(71) Applicant: Eaton Corporation, Cleveland, OH (US)

(72) Inventors: Sarika Marfatia, Battle Creek, MI (US); Thomas R. Connolly, Portage, MI (US); Anthony Stasik, Kalamazoo, MI (US); Tim Sandy, Barneveld, NY (US); Frederic Boissinot, Northville, MI (US); Graeme A. Jackson, Kalamazoo, MI (US)

(73) Assignee: Eaton Corporation, Cleveland, OH (US)

( * ) Notice: Subject to any disclaimer, the term of this patent is extended or adjusted under 35 U.S.C. 154(b) by 61 days.

(21) Appl. No.: 14/477,578

(22) Filed: Sep. 4, 2014

(65) Prior Publication Data
US 2015/0057898 A1 Feb. 26, 2015

Related U.S. Application Data

(63) Continuation-in-part of application No. 13/466,777, filed on May 8, 2012, now Pat. No. 9,008,924.

(60) Provisional application No. 61/873,425, filed on Sep. 4, 2013.

(51) Int. Cl.
| | |
|---|---|
| *B60W 10/02* | (2006.01) |
| *B60W 10/10* | (2012.01) |
| *B60W 30/18* | (2012.01) |
| *B60W 10/06* | (2006.01) |
| *B60W 10/113* | (2012.01) |
| *B60W 10/115* | (2012.01) |

(52) U.S. Cl.
CPC .............. *B60W 10/02* (2013.01); *B60W 10/06* (2013.01); *B60W 10/10* (2013.01); *B60W 10/113* (2013.01); *B60W 10/115* (2013.01); *B60W 30/18063* (2013.01); *B60W 2540/12* (2013.01); *B60W 2540/16* (2013.01); *B60W 2550/142* (2013.01); *B60W 2710/029* (2013.01); *B60W 2710/0666* (2013.01); *B60Y 2400/4244* (2013.01); *Y10T 477/644* (2015.01)

(58) Field of Classification Search
CPC ............................. B60W 10/10; B60W 10/02
USPC .................. 701/22, 31.1, 54, 68, 53; 477/92
See application file for complete search history.

(56) References Cited

U.S. PATENT DOCUMENTS

| | | | |
|---|---|---|---|
| 5,293,316 A | 3/1994 | Slicker | |
| 5,681,242 A | 10/1997 | Bates | |
| 8,315,752 B2* | 11/2012 | Kwon | B60L 15/2009 318/452 |
| 8,439,795 B2* | 5/2013 | Miyamoto | B60W 10/08 477/203 |
| 8,721,499 B2* | 5/2014 | Kim | B60W 30/18027 477/175 |
| 2011/0288735 A1* | 11/2011 | Shelton | B60W 10/02 701/68 |
| 2012/0100958 A1* | 4/2012 | Oue | B60W 10/08 477/21 |
| 2012/0150384 A1* | 6/2012 | Jung | B60W 30/18063 701/31.1 |

(Continued)

*Primary Examiner* — Thomas G Black
*Assistant Examiner* — Wae Louie
(74) *Attorney, Agent, or Firm* — Fishman Stewart PLLC

(57) ABSTRACT

A transmission control device for a vehicle that includes a controller configured to calculate a first transmission torque based on a first set of inputs, calculate a second transmission torque based on a second set of inputs, determine whether a brake pedal is applied, and apply either the first transmission torque or the second transmission torque based on whether the brake is applied.

20 Claims, 6 Drawing Sheets

(56) References Cited

U.S. PATENT DOCUMENTS

| | | | | |
|---|---|---|---|---|
| 2013/0017928 A1* | 1/2013 | Oh | ............ | F16H 61/20 477/94 |
| 2013/0288855 A1* | 10/2013 | Monsere | ............ | B60L 15/2045 477/24 |
| 2013/0304336 A1* | 11/2013 | Jackson | ............ | B60W 30/18063 701/53 |
| 2013/0311055 A1* | 11/2013 | Whitney | ............ | B60W 30/18027 701/54 |
| 2015/0057898 A1* | 2/2015 | Marfatia | ............ | B60W 10/06 701/51 |

* cited by examiner

| Calibration value | |
|---|---|
| C1 | 500 |
| C2 | 10 |
| C3 | 5 |
| C4 | -100 |
| C5 | 3 |

| Grade | -15% | -10% | -5% | 0% | 5% | 15% |
|---|---|---|---|---|---|---|
| Torque 1 | n/a | n/a | n/a | 10 | 35 | 85 |
| Torque 2 | 5 | 5 | 5 | n/a | n/a | n/a |
| Torque 3 | 18 | 13 | 8 | n/a | n/a | n/a |

| | | | | | | |
|---|---|---|---|---|---|---|
| Torque brake pressed | 5 | 5 | 5 | 10 | 35 | 85 |
| Torque Brake not pressed | 18 | 13 | 8 | 10 | 35 | 85 |

FIG. 3

Example calibration

Calibration value

| C1 | 500 |
|---|---|
| C2 | 30 |
| C3 | 5 |
| C4 | 0 |
| C5 | 20 |

| Grade | -15% | -10% | -5% | 0% | 5% | 15% |
|---|---|---|---|---|---|---|
| Torque 1 | n/a | n/a | n/a | 30 | 55 | 105 |
| Torque 2 | 5 | 5 | 5 | n/a | n/a | n/a |
| Torque 3 | 20 | 20 | 20 | n/a | n/a | n/a |

| Torque brake pressed | 5 | 5 | 5 | 30 | 55 | 105 |
|---|---|---|---|---|---|---|
| Torque Brake not pressed | 20 | 20 | 20 | 30 | 55 | 105 |

METHOD TO INITIATE, MANAGE, AND ADAPT VEHICLE MOTION AT LOW SPEEDS IN A WET CLUTCH DUAL CLUTCH TRANSMISSION

CROSS-REFERENCE TO RELATED APPLICATIONS

This application is a continuation-in-part of U.S. patent application Ser. No. 13/466,777, filed May 8, 2012, and also claims priority to U.S. Provisional Patent Application Ser. No.61/873,425, filed Sep. 4, 2013, which is incorporated herein in its entirety.

FIELD

The present disclosure generally relates to a transmission control system for controlling creep in a vehicle.

BACKGROUND

The powertrain system of an automobile is generally designed to supply a specific level of torque to the wheels of a vehicle even when the vehicle is stopped. This torque, commonly referred to as creep torque, works against the driver's application of the brakes such that the vehicle will begin to move when the brakes are released even if an accelerator is not depressed. However, in some situations, for example, when the vehicle is idling or when the vehicle is traveling downhill, a high level of creep torque is unnecessary and may cause needless consumption of fuel. Thus, there is a need for a transmission control system that can control the level of creep torque supplied by the powertrain to improve fuel economy.

On the other hand, supplying a consistently low level of creep torque or even no creep torque to increase fuel economy may be detrimental to driving performance. For example, supplying a low level of creep torque may cause unwanted rearward rolling when a vehicle is stopped on an uphill incline. Thus, there is also a need for a creep control system that can provide optimized creep performance while minimizing unnecessary fuel consumption.

BRIEF DESCRIPTION OF THE DRAWINGS

FIG. 3 is an exemplary calibration chart.

DETAILED DESCRIPTION

Figure 1:
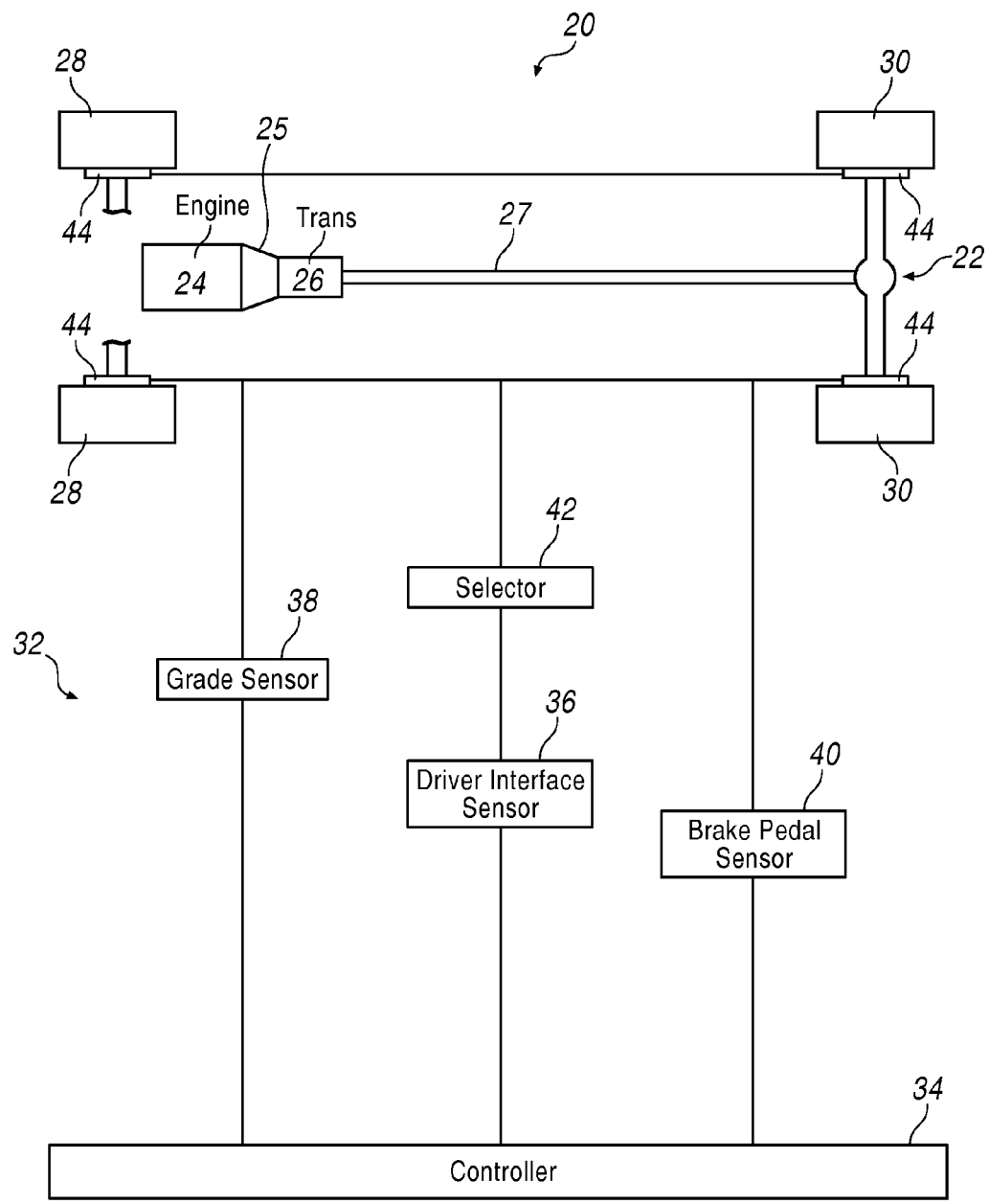
FIG. 1 is a schematic illustration of a transmission control system for controlling creep.

Referring now to the discussion that follows and also to the drawings, illustrative approaches are shown in detail. Although the drawings represent some possible approaches, the drawings are not necessarily to scale and certain features may be exaggerated, removed, or partially sectioned to better illustrate and explain the present disclosure. Further, the descriptions set forth herein are not intended to be exhaustive or otherwise limit or restrict the claims to the precise forms and configurations shown in the drawings and disclosed in the following detailed description.

FIG. 1 schematically illustrates a vehicle 20. The vehicle 20 includes a drivetrain 22 having an engine 24, a wet clutch 25, a transmission 26, axle 27 a first pair of wheels that, for convenience in the discussion that follows, are called the front wheels 28, and a second pair of drive wheels 30, opposite wheels 28, that for convenience are called the rear wheels. While wheels 30 are illustrated as being the drive wheels, in practice either set of wheels 28 or 30 may be the drive wheels or both sets of wheels 28 and 30 may be drive wheels. FIG. 1 also illustrates an exemplary transmission control system 32 that may be used to control the operation of the transmission 26 of vehicle 20. For example, the transmission control system 32 may be configured to receive output signals that may be used to determine whether to actuate one or more clutches such as by way of a single-clutch, a dual-clutch transmission (DCT), or a wet clutch transmission system. The transmission control system 32 may also be used to determine the level of creep torque to be supplied to the wheels. Thus, the transmission control system 32 may take many different forms and include multiple and/or alternate components 24, 26, 27, 30 as an example. While an exemplary transmission control system 32 is shown in FIG. 1, the exemplary components illustrated in the figures are not intended to be limiting. Indeed, additional or alternative components and/or implementations may be used.

As illustrated in FIG. 1, the transmission control system 32 may include a computing device such as a controller 34 configured to process signals from one or more sensors, including a driver interface sensor 36, a grade sensor 38, and a brake pedal sensor 40, discussed in more detail below. The controller 34 may be configured to perform calculations on the signals based on pre-programmed logic rules in order to determine a level of creep torque to be supplied by the powertrain to the wheels.

Computing devices such as controller 34 may employ any of a number of computer operating systems known to those skilled in the art, including, but by no means limited to, microprocessor systems, such as those manufactured by Motorola and Intel. The controller 34 may also employ known versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., and the Linux operating system. Computing devices may include any one of a number of computing devices known to those skilled in the art, including, without limitation, a computer workstation, a desktop, notebook, laptop, or handheld computer, or some other computing device known to those skilled in the art.

Computing devices such as the foregoing generally each include instructions executable by one or more computing devices such as those listed above. Computer-executable instructions may be compiled or interpreted from computer programs created using a variety of programming languages and/or technologies known to those skilled in the art, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium includes any medium that participates in providing data (e.g., instructions), which may be read by a computer. Such a medium may take many forms, including, but not limited to, non-volatile media, volatile media, and transmission media. Non-volatile media include, for example, optical or magnetic disks and other persistent memory. Volatile media include dynamic random access memory (DRAM), which typically constitutes a main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other tangible medium from which a computer can read.

In one exemplary approach, the controller 34 may be an electronic control unit (ECU), such as a microprocessor-based control, wherein the controller receives output signals from any of the sensors described below. The controller 34 may also include a central processing unit (CPU) for processing the output signals received from the sensors based on the programmed logic rules.

The sensors may each output a signal to the controller 34 such that the transmission control system 32 may control the level of creep torque supplied by the powertrain based on the signals being received. Thus, the level of creep torque supplied to the wheels of the vehicle 20 may be based on various parameters including, but not limited to, the driver's intended gear selection and the position of the vehicle 20. By controlling the level of creep torque only the necessary level of creep torque is supplied to the wheels. For example, when a vehicle 20 is oriented downwardly with respect to an incline (i.e., expected to travel downwardly) the level of creep torque may be reduced, as compared to a vehicle oriented up an incline (i.e., expected to travel upwardly), because the vehicle 20 is being urged generally in the same direction as the vehicle is traveling. Thus, any additional torque transmitted to the wheels would be unnecessary and would cause needless fuel consumption. Therefore, controlling the level of creep torque can improve the fuel economy of the vehicle.

To determine the appropriate level of creep torque the controller 34 may communicate with each of a driver interface sensor 36, a grade sensor 38, and/or a brake pedal sensor 40. Such sensors provide information as to the driver's intended gear selection, the position of the vehicle, and engagement of the brakes, respectively. This information may be communicated to the controller 34 using an input circuit comprising a direct wire linkage. However, the controller 34 may also communicate with each of the driver interface sensor 36, the grade sensor 38, and/or the brake pedal sensor 40 using a network communication link such as a Vehicle Area Network (VAN). Other suitable networks may also include Local Area Networks (LANs), Wide Area Networks (WANs). A combination of direct wire linkages and/or network communication links may also be used.

To maintain a certain level of uniformity between the data networks of all the trucks on the road today and in the future, various organizations related to the field set forth protocols that govern not only the physical characteristics of vehicle networks, but also the format of the data that is passed along the networks. Examples of network protocols designed specifically for in-vehicle networks are Controller Area Network (CAN) and SAE J-1708. J1708/1587 was established by the Society of Automotive Engineers (SAE). Protocol J1708/1587 establishes a serial data communications link for exchanging and monitoring data being communicated between microprocessors used in heavy-duty vehicle applications. Protocol J1708 generally defines the hardware requirements of the data communications link, while protocol J1587 deals with the actual data, the format of the data and/or functions that are to be transmitted across the data link. In another example, SAE J1939 is for communication and diagnostics among vehicle components.

Using the output signals that are sent through the input circuit, the controller 34 can determine the appropriate level of creep torque to be supplied given the current conditions of the vehicle. That is, the controller 34 and the CPU may be configured to perform calculations on the signals based on one or more programmed logic rules. A command output may be issued based on these calculations. Thus, the controller 34 can use the output signals received from the driver interface sensor 36, the grade sensor 38, and/or the brake pedal sensor 40 to determine the level of creep torque needed to provide ideal driving performance with optimized fuel economy.

As illustrated in FIG. 1, the controller 34 may process output signals from any one of the driver interface sensor 36, the grade sensor 38, the brake pedal sensor 40, or any other suitable sensor configured to output a signal. The driver interface sensor 36 is configured to output a signal representative of the desired mode of transmission or the desired gear ratio selected by the driver. The vehicle 20 may have one or more driver interface sensor 36. The driver interface sensor 36 may be a mechanical switch such as a non-contacting magnetic type switch. Magnetic switches generally offer higher reliability when used to determine sensor positions. Indeed, such switches may be configured to compensate for position tolerances and any changes in the mechanical connection. Magnetic switches may also provide improved durability, especially in vehicle applications. However, any suitable type of switch may be used to determine the desired mode of transmission or gear ratio. Moreover, the controller 34 may also be configured to decode a driver interface signal from an analogue, pulse width modulation (PWM) output or other types of sensor outputs to determine the sensor position.

In one exemplary approach, the controller 34 is in communication with the driver interface sensor 36 through a selector 42. The selector 42 may be any driver interface mechanism used to select a gear including, but not limited to, a shift lever and push buttons. The driver interface sensor 36 may be configured to determine whether the selector 42 is in a reverse, neutral, forward or parked position. The driver interface sensor 36 may also be positioned on the selector 42 or the sensor 36 may be positioned in any other suitable area of the vehicle 20 including the gearbox.

The driver interface sensor 36 may be configured to convert the position of the selector 42 into an electric output signal that is supplied to the controller 34. The controller 34 may then process the selection and determine whether to open/close the clutch and disengage/engage the gears. Thus, the controller 34 may provide an output command to control the level of creep torque supplied by the powertrain based on the driver's desired mode of transmission or the desired gear ratio. For example, if the vehicle is in a parked position with brakes applied for a predetermined duration, any significant level of creep torque is unnecessary because the vehicle is not moving forward or backwards nor does the driver intend for the vehicle to move forward or backwards. Thus, any significant level of creep torque supplied by the powertrain to the wheels results in needless fuel consumption. However, as a stationary vehicle is being reselected into a driving and/or as the brakes are released, some level of creep torque may be desirable to urge the vehicle in desired direction of motion when the vehicle brakes are released, especially if the vehicle is on an incline.

As noted above, the transmission control system 32 may further include a grade sensor 38. The grade sensor 38 may be configured to determine whether the grade of the vehicle will result in the vehicle being urged in generally the same direction as the vehicle is traveling. The grade sensor 38 may be a single or multi-axis accelerometer, a mechanical grade sensing switch, or any other suitable sensor configured to determine the position of the vehicle with respect to a horizontal plane. That is, the grade sensor 38 may be configured to send an electric output signal to the controller 34 indicating whether the front wheels 28 are higher in altitude from a horizontal plane than the rear drive wheels 30. This would indicate that the vehicle was at a positive grade. The grade sensor 38 may also determine whether the front wheels 28 are lower in altitude from a horizontal plane than the rear drive wheels 30, such that the vehicle is at a negative grade. The grade sensor 38 may also be configured to determine when a vehicle is on a substantially flat surface, or at about a zero percent grade. To determine the grade of the vehicle 20, the controller 34 may communicate with one grade sensor 38 or a plurality of grade sensors.

The grade sensor 38 is configured to communicate with the controller 34 and may be disposed on any solid vehicular structure or within the vehicle itself. As discussed above, the grade sensor 38 may communicate with the controller 34 using a direct wire linkage. However, the grade sensor may also communicate with the controller 34 over a network communication link, described above. The grade sensor 38 may also be disposed within the controller 34. In one exemplary approach, the controller 34 may perform calculations on the signal based on the programmed logic in order to determine the percent grade of the vehicle 20. However, an accelerometer may also be used to determine the percent grade based on the electric output signals produced by the grade sensor 38.

As noted above, the transmission control system 32 may further include a brake pedal sensor 40. The brake pedal sensor 40 may be a mechanical switch such as a non-contacting magnetic type switch. However, other suitable switches may be used. The brake pedal sensor 40 is configured to provide an electric output signal to the controller 34 indicating whether the driver has engaged or disengaged the brakes 44. The brake pedal sensor 40 may be configured to send an output signal to the controller 34 indicating whether a driver has engaged the brakes by depressing the brake pedal. The brake pedal sensor 40 may also provide an output signal to the controller 34 indicating that the brake pedal has not been depressed or that the brake pedal is being released. The brake pedal sensor 40 may be disposed on the brake pedal or any other suitable portion of the vehicle. As discussed above, the grade sensor 38 may communicate with the controller 34 using a direct wire linkage, a network communication link or any combination thereof.

Figure 2:
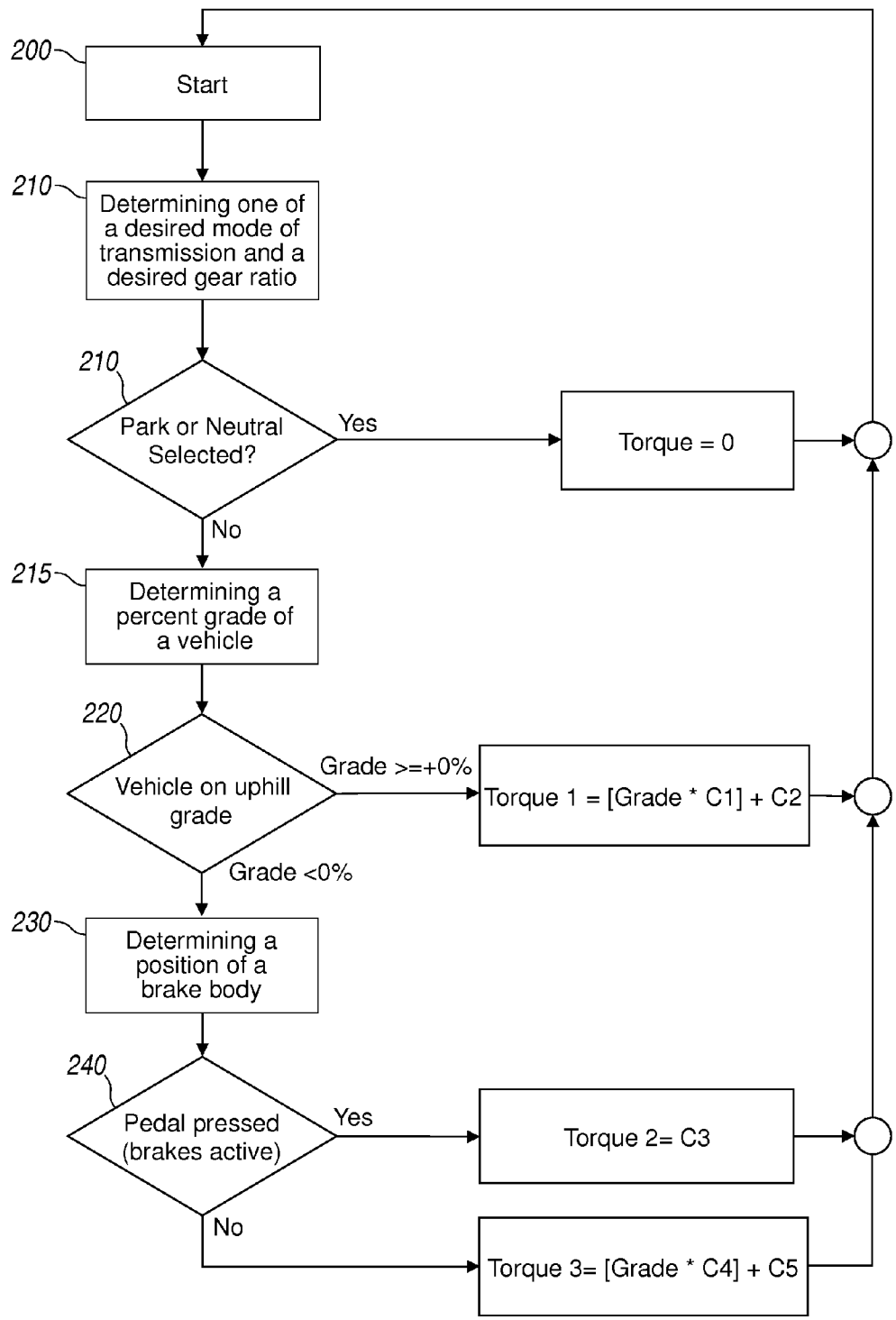
FIG. 2 is a flowchart illustrating a method of using a transmission control system for controlling creep.

With reference to FIG. 2, an exemplary method of operating the transmission control system 32 to provide ideal driving performance while reducing fuel consumption is shown. In Step 200, the computer operating system is enabled such that the level of creep torque to be supplied by the powertrain is determined. The controller 34 may begin processing the output signals received from any one of the driver interface sensor 36, engine 24, axle 27, wheels 30, or drive train 22) the grade sensor 38, and the brake pedal sensor 40 the sensors. Based on the programmed logic rules, the appropriate level of creep torque is determined and provided to the wheels. By providing only the level of creep torque necessary based on the conditions of the vehicle and driver preference, wasteful fuel consumption can be prevented.

In Step 210, the controller 34 receives an output signal from the driver interface sensor 36. Based on the programmed logic rules, the controller 34 can process the output signal to determine the desired mode and direction of motion of transmission or the desired gear ratio selected by the driver. If the controller 34 determines that the vehicle transmission has been shifted into park or neutral, the controller 34 signals that no level of creep torque should be supplied by the powertrain to the wheels. Indeed, in either position, the powertrain is operatively disengaged from the front wheels 28 and the rear wheels 30. Therefore, any level of creep torque transmitted from the powertrain to the wheels would be needless.

To the contrary, if the controller 34 determines that the vehicle is in a non park or non neutral mode, the system 32 proceeds to Step 215. In step 215, the controller 34 receives output signals from the grade sensor 38 and a percent grade is determined therefrom. Again, based on the programmed logic rules, the controller 34 can process the output signals to determine the percent grade of the vehicle. If the grade sensor 38 sends an output signal to the controller 34 indicating that the vehicle is at a positive percent grade, i.e. the front wheels 28 are higher in altitude from a horizontal plane than the rear drive wheels 30, the controller 34 can calculate the appropriate level of creep torque that should be supplied.

Such calculations are based on the programmed logic rules and pre-determined calibration values. The calibration values are determined based on a customer's driveability preference, that is, the qualitative assessment of the vehicle's response to the driver's input. As just one example, driveability may be based on the level of creep torque that is supplied when the brake pedal is pressed or not pressed. Depending on the type of vehicle or the purpose of the vehicle, more or less creep torque may be desired. The calibrations also take into account vehicle features that may have an affect on the customer's drivability preference, i.e. the weight of the vehicle. Generally the customer's preferred level of creep torque is provided as the preferred controller output and the necessary calibration values are determined based on the programmed logic rules. Exemplary calibration charts are provided in FIGS. 3 and 4. Although five calibration values are illustrated, in FIG. 3, more or less calibration values may be utilized.

The calibrations represent five calibration values C1 to C5 that when combined with the logic and calculations in FIG. 2 provide an output torque for conditions when the vehicle brakes are active or not active. Multiple calibration equations can be added as appropriate to provide more levels of control. Including, but not limited to, mathematical exponents that allow the linear gains to be provided as smoother curved gains.

In one exemplary approach, if the controller 34 determines in Step 220 of FIG. 2 that the vehicle is at about a zero percent grade, i.e. the vehicle is on a substantially flat surface, the calibration values are used to determine the level of creep torque to be supplied to the powertrain when the brake pedal is pressed or not pressed based on the customer's preference. In this exemplary approach, the level of creep torque to be supplied is represented by the equation $$T1=(\text{Percent Vehicle Grade})(C_1)+(C_2)$$

wherein the calibration values are provided in Nm. The first calibration value ($C_1$) provides the level of creep torque gain necessary to assist the vehicle in its assent up hill. When ($C_1$) is multiplied by the vehicle grade the torque will be proportional to the creep torque gain calibration. The second calibration value ($C_2$) provides the level of creep torque offset. Thus, the offset allows the torque to be increased or decreased based on user preference.

Accordingly, when the vehicle is at a substantially zero percent grade, the level of creep torque supplied will be equal to the value of $C_2$. The value of $C_2$, being based on customer preference, may be a low level of creep torque, which causes the vehicle to maintain a slow, generally constant vehicle speed when the brake pedal is pressed or even when it is not pressed. A low level of a creep torque may also allow a vehicle to begin moving forward on a substantially flat surface without depressing the accelerator. However, as described above the value of $C_2$ may be set to provide any level of creep torque based on user preference. By controlling the level of creep torque fuel can be conserved.

Similarly, if the controller determines in Step 220 that the vehicle is at a greater than zero percent grade, i.e. the vehicle is on a positive percent grade, the same equation and calibration values may be used to determine the level of creep torque to be supplied (whether the brake is applied or not). Typically, the calibration values are targeted so that the level of creep torque supplied will prevent rollback when the brake pedal is released. In one exemplary approach, the calibration values may be set such that the level of creep torque supplied to the powertrain is proportional to the grade of the incline. Thus, the level of creep torque supplied by the powertrain may be determined based on the angle of the incline such that only the necessary amount of torque is provided to assist the vehicle in moving up the incline. Accordingly, the application of excessive torque is prevented and unnecessary fuel consumption is decreased.

In, step 220, if the controller 34 determines that the vehicle is at a negative percent grade, i.e. the vehicle is directed down an inclined surface, the program logic causes controller 34 to proceed to step 230. In Step 230, the controller 34 receives an output signal from the brake pedal sensor 40 to determine the position of the brake. Based on the programmed logic rules, the controller 34 can process the output signal to determine whether the driver has engaged the brakes. In one exemplary approach, at step 240, if the brakes have been engaged, the level of creep torque to be supplied is represented by the equation $$T2=(C_3)$$

wherein the calibration values are provided in Nm. The first calibration value ($C_3$) provides the level of creep torque gain provided when the brake pedal is pressed and the vehicle is traveling in a downhill direction. Accordingly, when the vehicle is at a negative grade and the brakes have been engaged, a driver generally does not need or want an excessive level of creep torque urging the vehicle forward. Thus, the level of creep torque necessary to meet the driver's preference can be determined and only that level of creep torque is applied.

If the brakes have not been engaged in Step 240, the level of creep torque to be supplied is represented by the equation $$T3=(\text{Percent Vehicle Grade})(C_4)+(C_5)$$

wherein the calibration values are provided in Nm. The first calibration value ($C_4$) provides the level of creep torque gain necessary to assist the vehicle in its decent downhill. When ($C_4$) is multiplied by the vehicle grade the torque will be proportional to the creep torque gain calibration. The second calibration value ($C_5$) provides the level of creep torque offset. Thus, the offset allows the torque to be increased or decreased based on user preference.

When a vehicle 20 is traveling down an incline the level of creep torque necessary to urge the vehicle forward is reduced, as compared to a vehicle traveling up an incline, because the vehicle 20 is being urged in the direction that it is traveling if the goal is to move forward. Accordingly, the calibration values may be set such that the level of creep torque provided is proportional to the grade of the incline. Thus, the level of creep torque supplied is configured to assist the vehicle moving down an incline. Because the level of creep torque is proportional to the grade of the incline only the level of creep torque necessary to assist the vehicle is provided such, reducing the amount of excessive torque supplied by the powertrain and ultimately decreasing unnecessary fuel consumption.

Figures 4, 5:
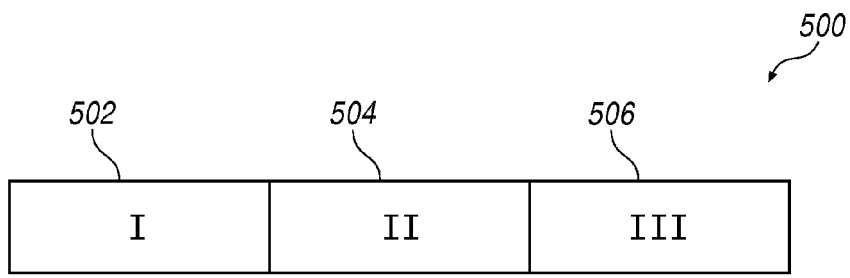
FIG. 4 is an exemplary calibration chart.
FIG. 5 illustrates operating regions of a wet clutch.

FIG. 4 illustrates exemplary calibration chart. The calibration values illustrated in FIG. 3 provide a torque output that is more directed towards a vehicle configured for fuel economy whereas the calibration chart in FIG. 4 is more directed towards driveability. That is, the creep torque calibrations in FIG. 3 for the same conditions are lower that those in FIG. 4 to save fuel. In FIG. 4, the creep torque calibrations are maintained at higher values to provide the driver with a fast vehicle response.

The amount of torque applied to the wheels in a dual clutch transmission (DCT) may be selected based on inputs that may differ, based on whether the brake pedal is engaged or not. Thus, instead of a single-defined "creep" that is applied whether the brakes are applied or not (as has been previously discussed), in this example the powertrain system is designed to supply a creep torque (CT) to the wheels of a vehicle after the vehicle has been stopped but the brake is released. That is, CT (in this example) is defined as the ability of the vehicle to slowly move when the driver releases the brake pedal and conveys a desire to move slowly but without applying an accelerator pedal. Urge-to-Move (UTM), on the other hand, is a torque that is applied when the vehicle is in gear and the brake pedal is applied, and UTM torque works against the driver's application of the brakes such that the vehicle will begin to move, or creep, based on the amount of CT applied, when the brakes are released (even if an accelerator is not depressed). Thus, UTM is identified as a vehicle state in gear and with the brake pedal applied. The vehicle does not move in UTM, but provides a torque to be ready to move when the brakes are released, at which point the CT is applied thereby giving the optimal balance of performance and fuel consumption.

A wet clutch, such as in vehicle 20 above, is operated to minimize losses in the clutch while maintaining the clutch in a position to provide the driver with a fast vehicle response. As an illustration shown in FIG. 5 a wet clutch is operated within three regions or clutch hardware points that are delineated by a position where there is no or marginal torque from the clutch circuit and the torque transmitting plates are apart, here in called the Low Torque Point (LTP) or non-transmitting clutch region (NTCR), and a position where the torque transmitting plates touch each other and majority of the torque begins to transmit here in called as the Plate Touch Point (PTP) or fully transmitting clutch region (FTCR). Between the two regions is a partially transmitting clutch region (PTCR) in which torque is partially transferred and there may be partial contact of the plates.

Referring to FIG. 5, diagram 500 illustrates operating regions of a wet clutch, such as wet clutch 25 of FIG. 1. A first region I NTCR 502, a second region II PTCR 504, and a third region III FTCR 506, are shown. In region I 502, the wet clutch is fully disengaged or opened, and no torque transfer occurs within the wet clutch. Thus, in region I 502, no power is transferred from the engine to the wheels via the clutch. In region III 506, the wet clutch plates are fully engaged but may not be fully compressed, and there is no, or essentially no, relative motion between plates and power transfer passes from the engine to the transmission to the wheels.

In region II PTCR 504, however, some torque transfer occurs because of the fluid viscosity of the wet clutch. That is, the plates of the wet clutch plates are proximate one another, and sufficiently proximate such that engine torque is partially transferred to the transmission via the fluid of the wet clutch and partial contact of the plates. Such operation is typically inefficient and inconsistent as the dynamics of the fluid, clutch and torque transmitting characteristics change and result in overall reduction in the optimized balance of performance and fuel economy. In addition, continuous clutch operation in this region can also cause aging of components due to the partial contact of clutch plates and other factors, as well as the localized fluid and clutch plate changes due to operating in this region/position.

In operation, as the wet clutch is engaged, very little losses, if any, occur in the wet clutch when in region I 502, because the plates of the wet clutch are sufficiently distant from one another so as to avoid viscous losses. However, in progressing from region I 502 to full engagement of the wet clutch at region III 506, the wet clutch passes through region II 504, during which time the viscous forces are applied between plates, resulting in slippage of the clutch plates and loss of efficiency in the wet clutch. Thus, the more efficiently the clutch can pass through region II 504, the more overall efficiency and consistent performance is obtained, reducing power losses and improving overall mileage of the vehicle.

As stated above, regions I 502 and II 504 are separated at a point therefore that defines a point or amount of separation between clutch plates, in which clutch engagement begins. Similarly, region III 506 begins at a point at which point there is no longer separation between clutch plates (except for a sheen of static fluid between the plates as they are in contact but not fully compressed), and at which point full clutch engagement occurs.

As such, torque applied in UTM may be selected such that losses are minimized, and also such that vehicle performance is not overly compromised as a result. That is, UTM torque is applied based on a tradeoff between performance and overall operational efficiency. Thus, in some applications, the clutch may be maintained in region II 504 such that performance is improved, but at the expense of frictional loses. In another example, the clutch may be maintained in region I 502, such as when the clutch is not engaged but the brake pedal is applied for an extended period of time. Thus, according to the disclosure, the amount of UTM torque or creep torque (CT) applied may be based on different factors such that a tradeoff is realized between performance and efficiency.

Figure 6:
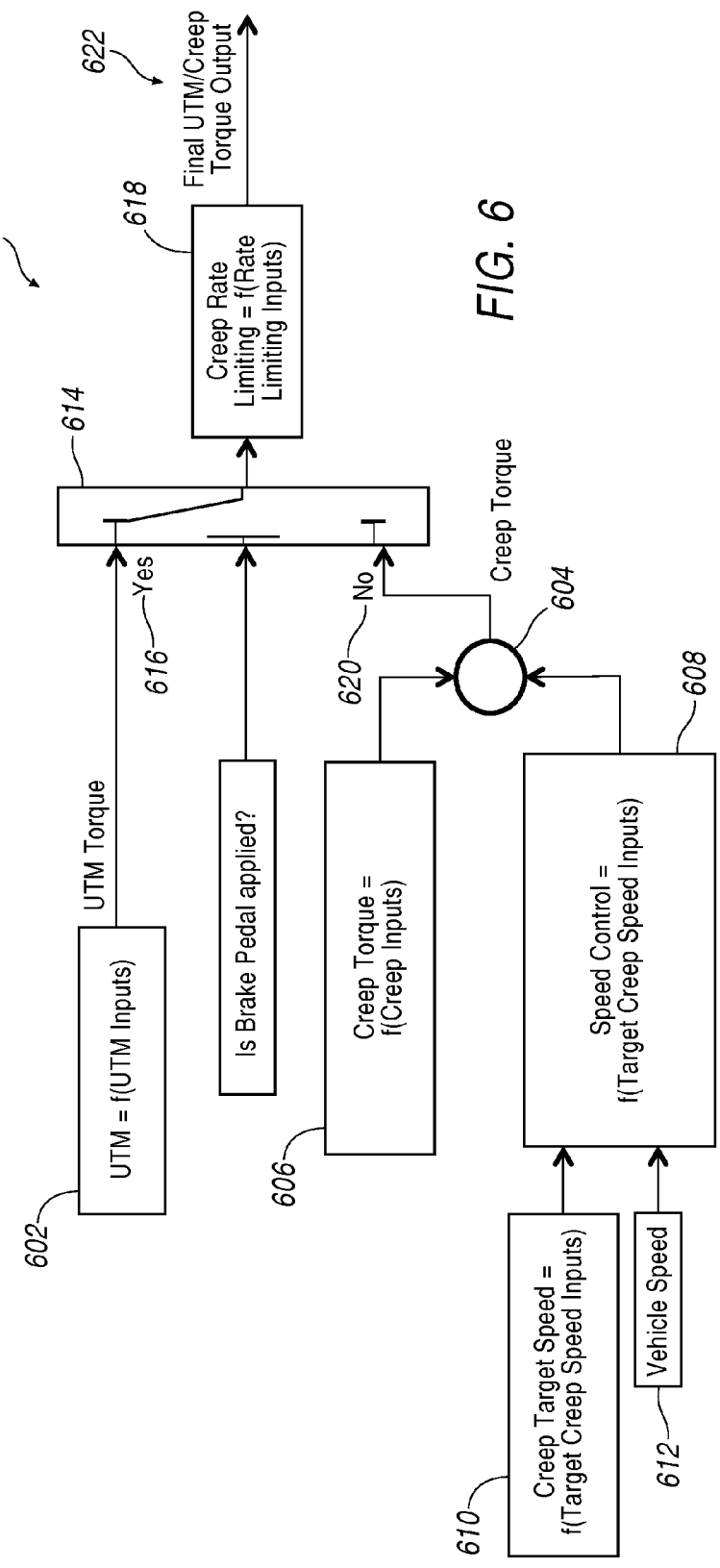
FIG. 6 illustrates a block diagram for controlling a transmission for a vehicle.

Referring to FIG. 6, a block diagram 600 is disclosed for controlling a transmission for a vehicle. Block 602 includes determining a UTM torque that is applied to the transmission once in non-neutral or non-park modes that is based on UTM inputs that include but are not limited to road grade, wet clutch fluid temperature, vehicle weight, clutch points LTP and PTP, forward or reverse selection, and vehicle speed. In one example the UTM inputs are based on the amount of time the vehicle has been stationary. That is, as a vehicle remains stationary for a long time with the brake applied, then in this example the clutch plates may be separated based on the duration of time in this condition to reduce the fuel consumption by unnecessary transmitting torque through the clutch when vehicle motion is not desired.

Block 604 includes a creep torque that also may be applied to the transmission that is based on a creep torque calculation at block 606, and based on a speed control calculation at block 608. The calculation at block 606 is based on open loop inputs that include but are not limited to road grade, wet clutch fluid temperature, engine, vehicle weight, forward or reverse selection, and total driveline ratio. More particularly, regarding driveline ratio, the calculation is affected by the overall driveline ratio that is based on any combination of items such as the transmission gearing, a differential, and the like.

Speed control at block 608 is based on target creep speed inputs that include forward or reverse selection. A reverse creep speed target may be much lower than a forward speed target because of, for instance, concerns of safety, applications or driving preferences. That is, in a forward gear, the target creep speed may be relatively high, such as 5 mph, as an example, which is based primarily on performance criteria. Whereas, for a reverse setting, the target creep may be, for instance, 1 mph, since reverse vehicle operation can have an increased likelihood of encountering and bumping a vehicle because of blind spots and inability to see behind the vehicle. Thus, at block 610 creep target speeds may be established based on whether the vehicle 610 is in forward or reverse, and the target creep speeds may be set based on vehicle type (a very heavy truck, for instance, may have a very low target creep speed, whereas a light sub-compact car may have a higher target creep speed). A speed selection in forward direction motion but no creep in reverse or vice versa are other examples of ability to target differentiated speeds for specific applications or driver preferences.

In addition, at block 612, current vehicle speed itself is a factor that impacts speed control. As an example, if a target creep speed is 5 mph and the current vehicle speed is 4 mph, then the difference of 1 mph is readily made up, compared to a vehicle having a current speed of 1 mph. That is, the vehicle speed is a factor that itself is used to determine the speed control, and the amount of creep torque applied is based on the difference between current speed and target speed. In other words, vehicle speed at block 612, as well as creep target speed at block 610 are both taken into account in establishing the speed control at block 608.

Referring still to FIG. 6, at block 614 is determined whether the brake pedal is applied. If so, 616, then the vehicle is stationary and the creep rate is established at block 618 and using the UTM torque calculated at block 602. If the brake pedal is not applied 620, then the vehicle is in motion and the creep torque (CT) is applied and subject to the calculations performed at blocks 606, 608, 610, and 612 that culminate in the calculation output from block 604. The creep rate at block 618 is calculated but also based on limiting hardware factors such as flow ability, and clutch hardware regions I 502, II 504, and III 506, as examples. That is, the creep rate is applied, but subject to limiting factors that are based on material limits, life cycle determinations, engine characteristics and the like, to ensure that the performance is within design constraints to ensure safe operation that does not needlessly compromise component life. As such, the final UTM or CT is output at 622, and applied to the vehicle accordingly.

As can be appreciated, it is contemplated that the final UTM or CT output at 622 is not a static and unchanging value, but rather a dynamic value that is under constant assessment and revision within a controller such as, for instance, controller 34 of FIG. 1. That is, as the dynamic situation changes (speed of vehicle, temperature, road grade, brake pedal applied, etc. . . . and as described above), the output torque at 622 also changes accordingly, and based on the various inputs illustrated.

Figure 7:
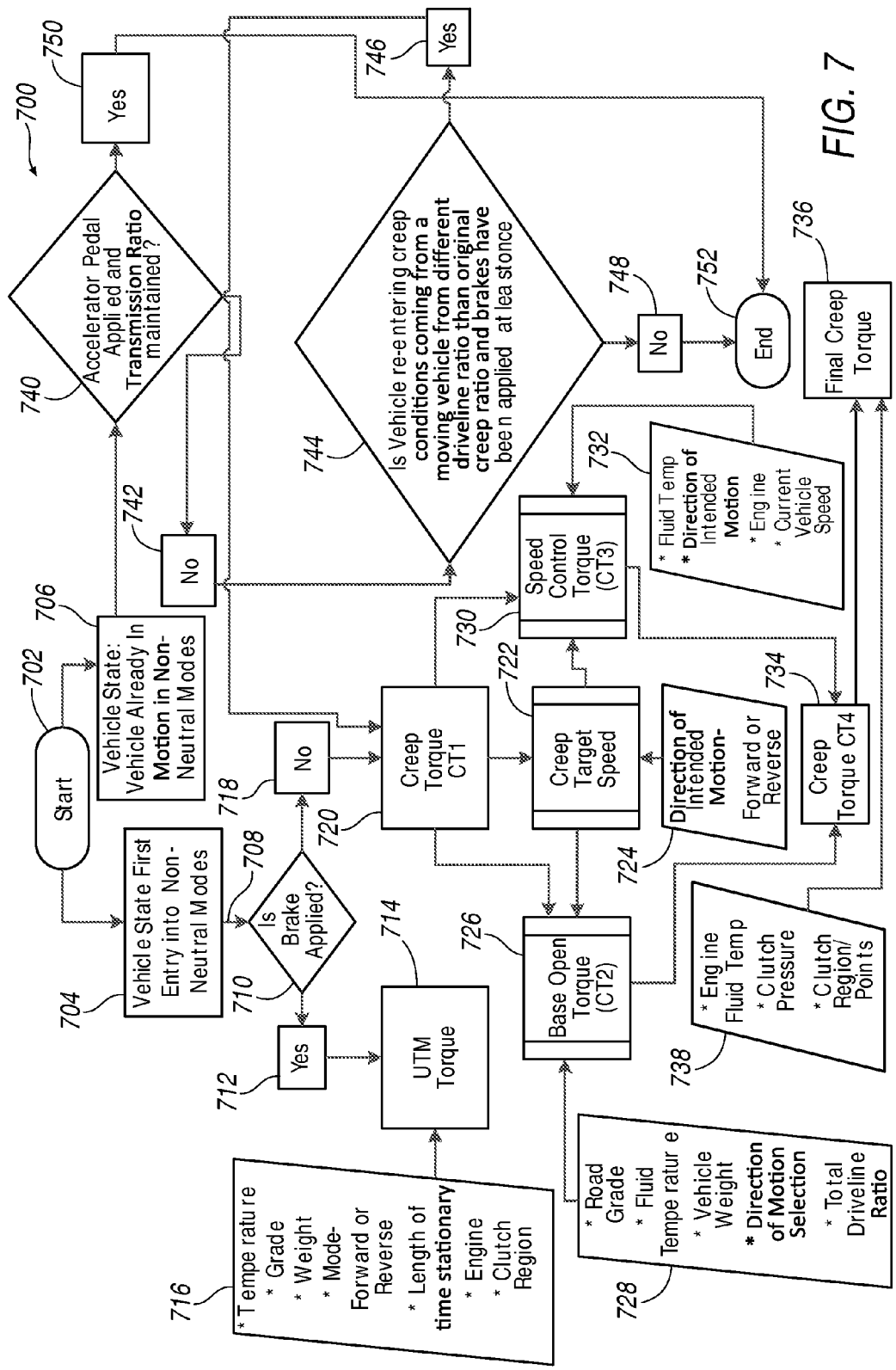
FIG. 7 is a process flow diagram for controlling a transmission for a vehicle.

The block diagram of FIG. 6 is illustrated as a process flow diagram 700 that is illustrated in FIG. 7, and which represent steps that may be controlled via a controller, such as controller 34. Starting at step 702, method 700 proceeds based on whether is first entering a non-neutral mode at step 704, or whether the vehicle is already in motion in non-neutral mode 706. If the vehicle is first entering into non-neutral modes at step 704, then method 700 next determines 708 at block 710 whether a brake is applied or not. If so 712, then at block 714 at UTM torque is applied that is based on inputs 716 that include but are not limited to fluid temperature, road grade (i.e., inclination), vehicle weight, engine, forward or reverse mode, length of time stationary, and the clutch region (that is, regions I 502, II 504, and III 506 as described above). If the brake is not applied 718, then the vehicle is in creep mode and a creep torque (CT1) is calculated at block 720. A creep target speed is determined at block 722 based on an input that includes a direction of intended motion as forward or reverse, at block 724. A base open torque (CT2) is calculated at block 726 based on inputs 728 that include but are not limited to road grade, fluid temperature of the clutch, vehicle weight, direction of motion selection, and total driveline ratio. A speed control torque (CT3) is determined at block 730 that is based on inputs from block 732 that include but are not limited to fluid temperature of the clutch, direction of intended motion, and current vehicle speed. The base open torque CT2 at block 726 and the speed control torque CT3 at block 730 are input at block 734 to yield a final creep torque at block 736 that is also based on inputs 738 that include but are not limited to engine, fluid temperature, clutch pressure, and clutch regions I 502, II 504, and III 506.

Returning to block 706 and the condition in which the vehicle is already in motion and in a non-neutral mode, at block method 700 determines whether the accelerator pedal is applied and a transmission ratio is maintained (that is, the vehicle is in drive, as an example). If not 742, then method 700 determines at block 744 if the vehicle is re-entering a creep condition after coming from a moving vehicle but from a different driveline ratio than the original creep ratio was based on, and if the brakes have been applied at least once. That is, block 744 determines if the vehicle is re-entering creep then it is determined whether a new creep torque should be determined. If so 746, then method 700 passes to the calculation of a final creep torque by moving back to block 720. However, if not 748, then the process ends at block 752. Similarly, if at block 740 the accelerator is applied and the transmission ratio has been maintained 750, then the vehicle is in a drive mode and the process ends at block 752.

That is, if conditions have changed, then the cycling through the steps of method 700 will change accordingly, accounting for changes in conditions, such as road grade, fluid temperature, whether the brake is applied, etc. However, if the accelerator has been applied 750, then the vehicle is no longer in creep or UTM mode, and the disclosed process ends at block 752 if the vehicle does not exit the selected mode. If vehicle exits the selected mode and shifts out of the selected ratio that it was originally creeping in, once it reenters the selected ratio it will reinitiate creep until the brake pedal or the accelerator pedal is applied/depressed As such, a torque application that includes both UTM and creep may maximize fuel efficiency, by establishing torque applied based on whether the vehicle brake pedal is applied. This is in contrast to a conventional torque converter that does not have the ability to affect fluid loses and other clutch efficiency issues. As such, torque applied at the clutch may be minimized but balanced with performance aspects when the vehicle initiates motion.

Torque application in both UTM and creep is based for example on vehicle mass and grade amongst many factors. That is, the applied torque is adjusted based on mass and grade for consistent vehicle behavior. In one example, the amount of vehicle mass may not be known. That is, a controller or controlling algorithm may be developed according to the disclosed method, but for application in a vehicle where the vehicle mass is not known. Such may be the case when the controller is developed for different vehicles or vehicle types. Thus, this strategy differentiates the mass used with varying vehicle configurations (engine, driveline ratio, etc.).

The disclosed method also accounts for providing different transition from stationary (UTM) to creep (with motion), based on whether the vehicle is in forward or reverse. This function is distinct from a vehicle having a torque converter, as the torque converter provides no such opportunity to effect clutch efficiency or vehicle speed based on whether in forward or reverse.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

What is claimed is:

1. A transmission control device for a vehicle, comprising a controller configured to:
    if the vehicle is stationary, calculate a first transmission torque that is an urge-to-move torque based on a first set of inputs;
    if the vehicle is in motion, calculate a second transmission torque that is a creep torque based on a second set of inputs;
    determine whether a brake pedal is applied;
    engage a wet clutch; and
    apply either the first transmission torque or the second transmission torque through the engaged wet clutch based on whether the brake is applied.

2. The transmission control device of claim 1, the controller further configured to:
    apply the first transmission torque through the engaged wet clutch if the brake pedal is applied and the vehicle is stationary; and
    apply the second transmission torque through the engaged wet clutch if the brake pedal is not applied and the vehicle is in motion.

3. The transmission control device of claim 2, wherein the first set of inputs comprise at least one of a road grade, a fluid temperature in the wet clutch, a vehicle weight, and a clutch hardware point.

4. The transmission control device of claim 2, wherein the first set of inputs includes an amount of time that the vehicle has been stationary.

5. The transmission control device of claim 2, wherein the second set of inputs includes open loop torque inputs that include at least one of a road grade, a fluid temperature in the wet clutch, and a vehicle weight.

6. The transmission control device of claim 2, the controller further configured to calculate the second transmission torque based also on:
    a vehicle speed, and
    target creep speed inputs based on whether the vehicle is in forward or reverse.

7. The transmission control device of claim 2, the controller further configured to limit a vehicle speed when the vehicle is in motion based on one of a current actuation pressure and a clutch hardware point.

8. A method for controlling a transmission for a vehicle, the method comprising:
    calculating a first transmission torque that is an urge-to-move torque, if the vehicle is stationary, based on a first set of inputs;
    calculating a second transmission torque that is a creep torque, if the vehicle is in motion, based on a second set of inputs;
    determining whether a brake pedal is applied;
    engaging a wet clutch; and
    applying either the first transmission torque or the second transmission torque through the engaged wet clutch based on whether the brake is applied.

9. The method of claim 8, further comprising:
    applying the first transmission torque if the brake is applied and the vehicle is stationary; and
    applying the second transmission torque if the brake is not applied and the vehicle is in motion.

10. The method of claim 9, wherein calculating the first set of inputs comprises calculating the first set of inputs to include at least one of a road grade, a fluid temperature in the wet clutch, a vehicle weight, and a clutch hardware point.

11. The method of claim 9, wherein calculating the first set of inputs comprises calculating the first set of inputs to include an amount of time that the vehicle has been stationary.

12. The method of claim 9, wherein calculating the second set of inputs comprises calculating the second set of inputs to include open loop torque inputs that include at least one of a road grade, a fluid temperature in the wet clutch, and a vehicle weight.

13. The method of claim 9, the method further comprising calculating the second transmission torque based also on:
    a vehicle speed, and
    target creep speed inputs based on whether the vehicle is in forward or reverse.

14. The method of claim 9, wherein if the brake pedal is applied and the wet clutch is engaged, then after a duration of time the wet clutch is disengaged to reduce fuel consumption when vehicle motion is not desired.

15. A vehicle, comprising:
    an engine;
    a wet clutch;
    a transmission; and
    a transmission controller configured to:
        calculate a first transmission torque that is an urge-to-move torque based on a first set of inputs, and if the vehicle is stationary;
        calculate a second transmission torque that is a creep torque based on a second set of inputs, and if the vehicle is in motion;
        determine whether a brake pedal of the vehicle is applied; and
        apply either the first transmission torque or the second transmission torque through the engaged wet clutch based on whether the brake pedal is applied.

16. The vehicle of claim 15, wherein the controller is further configured to:
    apply the first transmission torque if the brake pedal is applied and the vehicle is stationary; and
    apply the second transmission torque if the brake pedal is not applied and the vehicle is in motion.

17. The vehicle of claim 16, wherein the first set of inputs comprise at least one of a road grade, a fluid temperature in the wet clutch, a vehicle weight, and a clutch hardware point.

18. The vehicle of claim 16, wherein the first set of inputs includes an amount of time that the vehicle has been stationary.

19. The vehicle of claim 16, wherein the second set of inputs includes open loop torque inputs that include at least one of a road grade, a fluid temperature in a wet clutch, and a vehicle weight.

20. The vehicle of claim 16, wherein the controller is further configured to calculate the second transmission torque based also on:
    a speed of the vehicle, and
    target creep speed inputs based on whether the vehicle is in forward or reverse.

* * * * *